Jan. 18, 1966    R. J. McCRORY ET AL    3,229,900
REVERSE LEAKAGE SEAL FOR RECIPROCATING PARTS
Original Filed April 8, 1960    2 Sheets-Sheet 1

ROLLIN J. McCRORY
JOSEPH H. McNINCH, JR.
ALBERT K. DAGGETT
JOHN B. DAY, JR.
INVENTORS

BY Gray, Mase, and
Dunson
ATTORNEYS

Jan. 18, 1966   R. J. McCRORY ET AL   3,229,900
REVERSE LEAKAGE SEAL FOR RECIPROCATING PARTS
Original Filed April 8, 1960   2 Sheets-Sheet 2

ROLLIN J. McCRORY
JOSEPH H. McNINCH, JR.
ALBERT K. DAGGETT
JOHN B. DAY, JR.
INVENTORS

BY Gray, Mase, and Dunson

ATTORNEYS

United States Patent Office 3,229,900
Patented Jan. 18, 1966

3,229,900
REVERSE LEAKAGE SEAL FOR
RECIPROCATING PARTS
Rollin J. McCrory, Worthington, and Joseph H. McNinch, Jr., Columbus, Ohio, Albert K. Daggett, Fullerton, Calif., and John B. Day, Jr., Columbus, Ohio, assignors, by mesne assignments, to The Battelle Development Corporation, Columbus, Ohio, a corporation of Delaware
Original application Apr. 8, 1960, Ser. No. 20,870, now Patent No. 3,146,940, dated Sept. 1, 1964. Divided and this application July 31, 1963, Ser. No. 303,978
8 Claims. (Cl. 230—203)

This invention relates to a seal for rapidly reciprocating parts. More particularly, it relates to a liquid-type seal for the prevention of fluid flow around the edges of rapidly reciprocating parts as one moves within the other. This application is a divisional application of our copending application "Reverse Leakage Seal for Reciprocating Parts," Serial No. 20,870, filed April 8, 1960, now U.S. Patent No. 3,146,940, which was a continuation-in-part of our application Serial No. 705,334, filed December 6, 1957, now abandoned.

One of the most frequently found uses of seals around reciprocating parts is in internal-combustion engines and in positive displacement pumps and compressors. Seals frequently used at the peripheral edges of pistons where contact is made with a cylinder wall are steel piston rings, packings of felt or rope, and O-rings. These are, of course, satisfactory in many and most applications. However, in those applications where the pressure differential between one side of the piston and the other is high and the rate of reciprocation is high, the problem of sealing is very difficult. Also, in certain installations where the operative fluid on the high pressure side of the piston should not be lost because of the expense involved in maintenance and replacement, the problem of providing an adequate seal is most important. When these conditions are combined, i.e., in installations where the pressure differential is high, the rate of reciprocation is high, and the prevention of loss is very important, the provision of an adequate seal is most critical and may be the difference between success and failure of a unit for a particular application.

One such instance is found in the problem of sealing a refrigerant-gas compressor that is operatively connected to, and may be integral with, a free-piston internal-combustion engine. Free piston internal-combustion engines may operate at a high cyclic rate up to 4000 cyles per minute. When constructed in conjunction with a gas compressor, a free-piston engine imparts the same rate to the compressor piston. When a free-piston-engine-actuated refrigerant-gas compressor, hereinafter referred to as a free-piston engine compressor, is used in the refrigeration system of an air-conditioning unit or other similar refrigeration system, it is important that the refrigerant gas loss be held to a very small figure so that the system need not be charged oftener than once each year and preferably not oftener than every five years.

It has been found that ordinary seals such as piston rings, O-rings, and packings are not suitable as seals for the compressor piston in a free-piston engine compressor, because of either leakage, premature failure, or excessive friction.

This invention comprises sealing apparatus and a sealing method for the piston of a free-piston engine compressor, or other rapidly reciprocating parts, that provide for withstanding the rigors of this type of service. In one embodiment of this invention, the piston of the compressor is provided with a recess at its outer peripheral surface in which is disposed a sealing liquid in contact with the cylinder wall. Means is provided to control the pressure of the sealing liquid so that liquid flow takes place toward the compressor chamber. The flowing liquid therefore blocks the passage of gas from the compressor chamber. Means is provided to collect and separate the sealing liquid from the gas and return the sealing liquid at proper pressure to the enclosure formed by the recess in the piston and the cylinder wall.

It is therefore the broad purpose of this invention to provide a seal which will satisfactorily prevent the passage of fluid around the position of contact between rapidly reciprocating parts. It is another purpose to establish a method of liquid sealant control and movement in a sealing system which will insure that the liquid sealant will flow in the proper direction to block the passage of compressor fluid. It is a further purpose to also provide a method of sealing wherein the pressure in the fluid is controlled so that the pressure in the liquid sealant, when at the surface of contact between the reciprocating parts, is at a pressure higher than the pressure in the compressor chamber a substantially uniform increment throughout the cycle of the compressor.

It is another purpose of this invention to provide apparatus which will control the pressure in the liquid sealant of a refrigerant-gas compressor to an amount that will provide minimum loss of refrigerant gas through the sealing liquid.

It is another purpose of this invention to provide apparatus which will control the pressure of the refrigerant gas of a refrigerant gas compressor above the compressor chamber to an amount below the pressure of the liquid sealant thereby providing a flow of sealing liquid in a direction toward the compressor chamber to provide a minimum loss of refrigerant gas from the compressor system.

Features of this invention are: the way in which a seal is provided without excessive frictional resistance to motion between reciprocating parts; the way in which the seal is constantly replaced and therefore there is no appreciable wear on the seal and no lost time in replacing worn components; the way in which the problem of fluid loss through the liquid sealant is overcome by the control of the sealing liquid pressure; the way in which the problem of fluid loss through the sealing liquid is overcome by the control of the fluid pressure adjacent to the sealing gland; and the way in which a satisfactory seal is provided in a free-piston engine compressor making such a power source conveniently usable in refrigeration systems.

To these and other ends, this invention comprises apparatus for and a method of sealing around reciprocating parts, the preferred form of which is disclosed in the following description and attached drawing. Although the apparatus, structure, and method decribed and shown in detail refer with particularity to a free-piston engine refrigerant-gas compressor, it is apparent that this invention should not be limited thereto. Many of the significant details of this invention apply with equal qualification to the sealing of reciprocating parts in general. The invention may be used for other purposes, where its features are advantageous.

Figure 1:
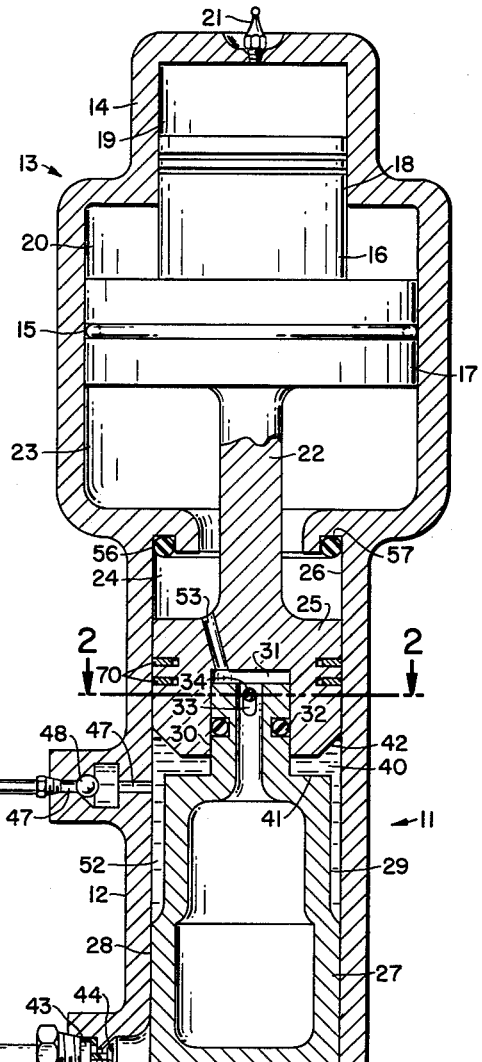
FIG. 1 is a sectional elevational view of a compressor having constructed therein one form of the sealing apparatus of this invention, which employs the method of this invention.

Referring to FIG. 1, an cylinder 12 forms the outer housing or frame member of a compressor, designated generally as 11. The compressor 11 may be formed integrally as a part of the frame of a compressor actuating device, such as a free-piston engine designated generally as 13. The details of construction of a free-piston engine may vary and in general are well known.

The free-piston engine 13 comprises a combustion cylinder 14 and a larger diameter control cylinder 15, having a piston 16 mounted theerin for reciprocable motion. The piston 16 comprises a major diameter portion 17 adapted to reciprocate in the control cylinder 15, and a minor diameter portion 18 constructed to reciprocate in the combustion cylinder 14. The combustion cylinder 14 forms a combustion chamber 19 in conjunction with the minor diameter portion 18. Major diameter portion 17 partitions control cylinder 15 into a pump chamber 23 at one side and a rebound control chamber 20 at the opposite side. Ignition means 21 such as a spark plug may be provided in the head end of the combustion chamber 19.

Auxiliary well-known equipment such as a source of electrical potential for the spark plug 21 and a means of injecting fuel into the combustion chamber 19 are provided, together with proper porting and other construction features.

At the one side of the larger diameter portions 17 of the piston 16, a connecting rod 22 is either integrally formed with the piston 16 or fastened rigidly thereto. The connecting rod 22 extends into the compressor cylinder 12, and in the embodiment of the invention shown in FIG. 1, is formed into a first compressor piston 25. Piston 25 is constructed to reciprocate by sliding fit along an inner wall 26 of cylinder 12. Sealing members 70, which may be conventional piston rings, are provided in grooves on the outer peripheral surface of the first compressor piston 25 to prevent the flow of liquid upward into a chamber 24 above. A second compressor piston 27 having a first major diameter portion 28, an intermediate recessed diameter portion 29, and a minor diameter guide portion 30, is constructed to reciprocate in cylinder 12 by sliding telescoping fit at an adjacent spaced position below the first compressor piston 25. Minor guide diameter portion 30 is received in a bore 31 centrally positioned in the lower face of first compressor piston 25. The outer surface of the guide portion 30 is provided with a seal 32, which may be an O-ring in a groove. A slot 33 is transversely located adjacent the upper end of the minor diameter portion 30. Slot 33 receives a transversely positioned pin 34 which is disposed in a receptive pin bore 35 through opposite sides of piston 25.

The above-described construction, consisting of the first compressor piston 25 and second compressor piston 27, comprise a partition unit whose major diameter has a surface of contact along the inner wall 26 of cylinder 12. The surface of contact has a cavity or an enclosure 40 formed by the wall 26 of cylinder 12, the surfaces of piston 27 including the recess portion 29 and the minor diameter portion 30, the intermediate step portion 41 which is between, and the lower surfaces 42 of the piston 25.

Piston 27 may be hollow, as shown in FIG. 1, if it is desirable to lessen its weight.

Cylinder 12 is constructed with a plurality of apertures, including a suction inlet 43, having an inwardly opening check valve 44; a discharge outlet 45 having an outwardly opening check valve 46; and a sealant inlet 47 having an inwardly opening check valve 48. Inlet 47 is in communication with the enclosure 40 at all time. A sealant liquid 52, which may be oil, is provided in the enclosure 40.

At one end 49, piston 27 forms a compressor chamber 50 in conjunction with the walls 26 and a closure end 51 of cylinder 12.

The free-piston engine 13 operates through the combustion of fuel in the chamber 19 forcing piston 16 downward in the power stroke. The downward stroke compresses refrigerant gas in the compressor chamber 50. At the end of the power stroke, piston 16 is returned to head-end position by energy in the refrigerant gas. Air trapped in central chamber 20 and pump chamber 23 may be vented or utilized to control the stroking of engine 13.

When the minor diameter portion 18 uncovers the exhaust ports on the downward stroke, the pressure in combustion chamber 19 is immediately reduced. While the pressure in chamber 19 decreases, the pressure in compressor chamber 50 remains high as the piston continues downward by momentum. When the downward kinetic energy is consumed the piston reverses and starts up, driven by the gas in compressor chamber 50 at discharge pressure. The pressure in chamber 50 immediately decreases, and as soon as the pressure in compressor chamber 50 decreases sufficiently to create a negative pressure differential across valve 44, valve 44 opens. The opening of valve 44, allows chamber 50 to fill with gas from the suction inlet 43. Substantially at the same time discharge outlet valve 45 closes because the pressure on the discharge side is higher than the side toward chamber 50. The pressure of the gas admitted through valve 44 is high enough to force second compressor piston 27 upward. The upward force is transferred through the liquid in enclosure 40, the first compressor piston 25, and the connecting rod 22. Thus, by means of the suction pressure of the compressor gas, the piston 16 is returned to head-end position on the intake stroke of the engine 13, completing the combustion cycle.

Upon the commencement of the downward stroke of first compressor piston 25, valve 44 closes. During the downward stroke the passage of liquid upward around minor diameter portion 30 is prevented by sealing member 32. Accumulation of pressure in bore 31 above the upper end of portion 30 is prevented by means of a vent 53. When the pressure in chamber 50 becomes greater than the pressure in the discharge line 55, valve 46 opens and gas in discharged from outlet 45 into discharge line 55.

Since the area of piston 27 that is in contact with the sealant liquid 52, normal to the axis of the piston, is less than the area of the piston 27 in contact with the gas in chamber 50, normal to the axis of the piston 27, the pressure of the sealant liquid 52 is higher than the pressure of the gas in chamber 50. Therefore, any leakage between the sliding contact surface of the piston 27 and the wall 26 is oil leakage toward the compression chamber 50. Since any space, no matter how small or large, between the piston 27 and the wall 26 is occupied by oil flowing toward the compressor chamber, the gas in compressor chamber 50 is effectively prevented from leaking and is sealed from passage around the reciprocating components of the apparatus.

Because of suction pressure remaining in compression chamber 50 when the engine is shut off, the piston 16 always comes to rest at head-end position, opposite to that shown in FIG. 1. In order to provide a static seal for the compressor unit during periods when the apparatus is not in operation, a static seal 56, which may be an O-ring, is provided in a groove 57 at the upper end of cylinder 12. When the engine stops at head-end positions, the upper face of piston 25 rests against the seal 56 and prevents the escape of gas until the engine is started and the liquid seal is in operation.

Referring further to FIG. 1, discharge line 55 is connected into the top of an enclosed separator reservoir 58. A compressed gas discharge line 59 is connected to the top of separator 58. At a position near the bottom a conduit 60 is connected from the separator 58 into a stripper 61. The stripper 61 is an enclosed vessel having an outlet conduit 62 at the top in communication with a check valve 63. Check valve 63 is in communication with, and opens toward, the inlet suction line 64 to the inlet suction valve 43 of compressor 11.

At the discharge end of conduit 60 in stripper 61, is a float valve 65 of conventional construction which opens responsively to the liquid level in stripper 61. A source of heat, representatively shown as a flame 67, is provided beneath the stripper 61. From a position near the bottom and below the liquid level, a conduit 68 connects stripper 61 to the sealant liquid inlet 47 on the cylinder 12.

In the operation of the apparatus and method of this invention the sealant liquid passes into the compressor chamber 50. In order that this sealant liquid shall not be wasted the discharge line 55 is connected to the separator 58 wherein the large particles and liquid droplets of sealant liquid 52 collect by gravity at the bottom. The compressed gas is then discharged through the line 59 for whatever use it has been compressed.

In an air compressor this may be the operation of an operating device in which case the sealant liquid, which would probably be oil, is used to advantage to lubricate the operating device. In other instances, the compressor gas may be a refrigerant gas such as Freon 12, and small particles may be carried into the discharge and refrigerator system without harm, being returned in the suction line 64. Therefore, the absorption of the liquid sealant in the compressor gas system is not usually detrimental to the operation of the apparatus and method.

On the other hand, any means by which the refrigerant gas may be carried in the return of the sealant liquid to the enclosure 40 is very detrimental to the operation of the system. The main detriment is the loss of gas, which in the case of a refrigerating system, may not be tolerated in most instances.

In many refrigeration systems the discharge pressure is as high as 150 to 200 p.s.i. absolute; the suction pressure is about 50 p.s.i. absolute; and the temperature of the refrigerant gas may reach as high as 200° F. during the compression stroke. In the normal reciprocation of the piston 27, a film of liquid sealant is deposited on the walls 26 of the chamber 50, and it has been found that a liquid sealant such as oil will dissolve a refrigerant gas, such as Freon 12, at the temperature and pressure existing in the compressor chamber 50. This dissolved gas is carried into the reservoir in the separator 58. Sealant liquid is pumped through the conduit 60 by reason of a high pressure in the separator 58 and discharges into the stripper 61 until the float valve 65 is actuated by the level of the sealant liquid 52 by raising the float 66. The application of heat from the flame source 67 to the liquid 52 in the stripper 61 evaporates the compressor gas from the liquid at the surface into the accumulator chamber above. The gas then passes through the outlet 62 to the pressure differential valve 63. Pressure differential valve 63 is adjusted to open when the gas pressure in the stripper 61 becomes more than about 10 pounds greater than the suction pressure to the compressor.

In a refrigeration system as previously described having a suction pressure of about 50 pounds the pressure differential valve 63 is adjusted to open at 60 p.s.i. absolute. Therefore, the pressure on the liquid sealant in the stripper 61 is maintained at a pressure of about 60 pounds and the dissolved gas may be stripped until only a negligible amount of gas remains in the liquid at this low pressure. The liquid sealant is carried through the conduit 68 to the liquid sealant inlet 47 and is admitted to the enclosure 40 upon the opening of the check valve 48 whenever the pressure in the enclosure 40 is less than the pressure in the stripper 61. The check valve 48 will therefore open whenever leakage past piston 27 lowers the pressure in enclosure 40 sufficiently.

It has been found in the operation of the compressor, if the low pressure stripper 61 is not provided, the oil is carried back to the enclosure 40 carrying dissolved gas with it. A film of oil is deposited on the upper wall 26 of the cylinder 12 by reason of the movement of the piston 25 and the enclosure 40 to its uppermost position. The dissolved gas will be evaporated and lost at the lower pressure condition which exists above the piston 25, when the piston 25 is at its lowermost position. In the refrigeration apparatus of the example the low pressure stripper 61 evaporates the dissolved refrigerant gas, carrying it back to the refrigeration system and preventing its loss from the oil in chamber 24 above enclosure 40.

By means of the apparatus disclosed, and by means of the method of operating the seal so that pressure conditions in the sealant liquid cause flow toward the compressor chamber, in conjunction with the low pressure stripping process step, it has been found that the compressor system may be operated over prolonged periods of time with negligible losses of gas from the system.

Figure 2:
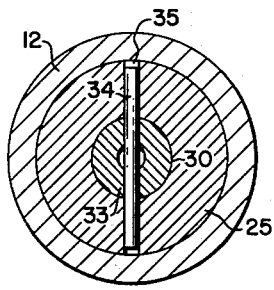
FIG. 2 is a sectional view taken along the line 2—2 of FIG. 1.

Although the apparatus and the method disclosed and shown in FIGS. 1 and 2 are particularly advantageous in their application to the problem of sealing a rapidly reciprocating refrigerant gas compressor, certain of the features of the invention may be utilized in different forms of apparatus and when using different sealing liquids and compressor gasses.

Figure 3:
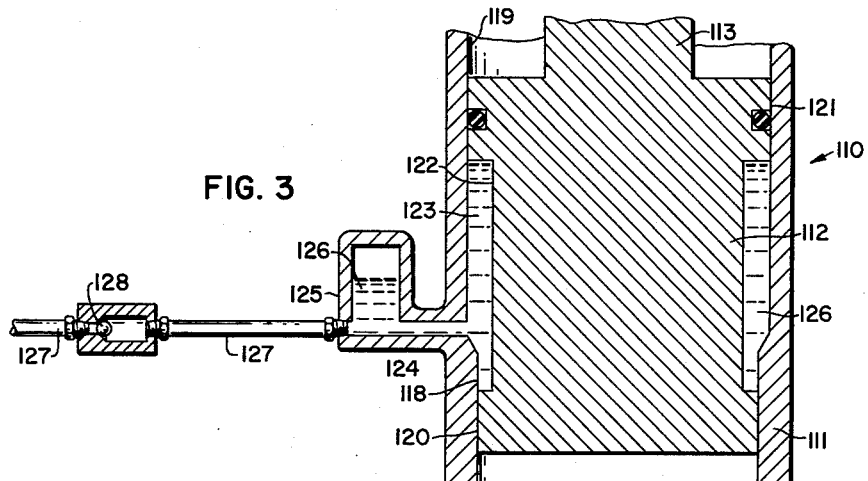
FIG. 3 is a schematic view of another form of a portion of the sealing apparatus of this invention, which employs the method of this invention.

Referring to FIG. 3, a reciprocating piston compressor is schematically shown of a different form although employing the method of the invention. A gas compressor designated generally as 110 comprises a cylindrical frame 111 and a piston 112 constructed to reciprocate therein by sliding fit. The frame 111 may form a part of a free-piston engine or other operating device. Piston 112 may be connected to a free piston or crank arm by means of the up standing connecting rod portion 113. Piston 112 forms a compressor chamber 114 in conjunction with cylinder 111 and the closure means 115 at one end. An inwardly opening, inlet check valve 116 of conventional construction and an outwardly opening discharge check valve 117, also of conventional construction, are provided in communication with the chamber 114.

Cylinder 111 is provided with a minor diameter portion near the compressor end changing to a major diameter portion near the opposite end. Piston 112 is provided with mating sliding contact portions 120 and 121 separated by a recessed portion 122. Recess portion 122 forms an enclosure 123 in conjunction with cylinder 111. At one side of cylinder 111, is provided a conduit 124 in communication with a surge tank 125. A sealant liquid 126 is provided in the enclosure 123, conduit 124, and surge tank 125. A sealant supply line 127 connects with the surge tank 125 through an inwardly opening check valve 128.

As in the apparatus of FIGS. 1 and 2, the compressor 110 is connected to other apparatus requiring the compressed gas and the connection may be made through a separator. The separator may be connected through a stripper to the sealant liquid supply line 127. However, the successful operation of the method and apparatus only requires that the supply line 127 be connected to a source of sealant liquid having a pressure greater than the pressure in the surge tank and enclosure 123 at some time during reciprocation of the piston 112.

In the operation of the apparatus, shown in FIG. 3 as the piston descends on the compression stroke, the volume of the enclosure 123 is decreased by reason of the advancing proportion of the major portion of the cylinder 111 in enclosure 123. The decreases in volume of the enclosure 123 forces the liquid sealant 126 out through the conduit 124 into the surge tank 125. The increase in the amount of sealant liquid in the surge tank 125 decreases the accumulator volume above the liquid 126 in surge tank 125 and, therefore, increases the pressure in the accumulator portion. The increase in the pressure in the surge tank 125 causes the pressure in the liquid 126 to increase progressively with the advance in downward stroke of piston 112. The volume and proportion of the various parts are arranged such that the pressure in the enclosure 123 increases proportionately with the increase in compressor chamber 114 and that the pressure in enclosure 123 is at all times slightly above the pressure in the compression chamber 114. Since the pressure of sealant liquid 126 in the enclosure 123 is always slightly greater than the pressure in the compressor chamber 114, any leakage past the minor diameter portion 120 of the piston 112 will be in the direction of the chamber 114 and will seal the compressor chamber against loss of compressor gas around the sides of the piston 112.

On the upstroke of the piston 112, when the pressure in enclosure 123 becomes lower than the pressure in the stripper, check valve 128 opens and admits sealant liquid to the surge tank 125 and enclosure 123 as necessary for replacement. Sealant liquid which flows past the minor diameter 120 of piston 112 into compressor chamber 114 flows out through the discharge outlet and may be trapped in a separator as necessary in a manner similar to that shown for the seal apparatus of FIG. 1.

Figure 4:
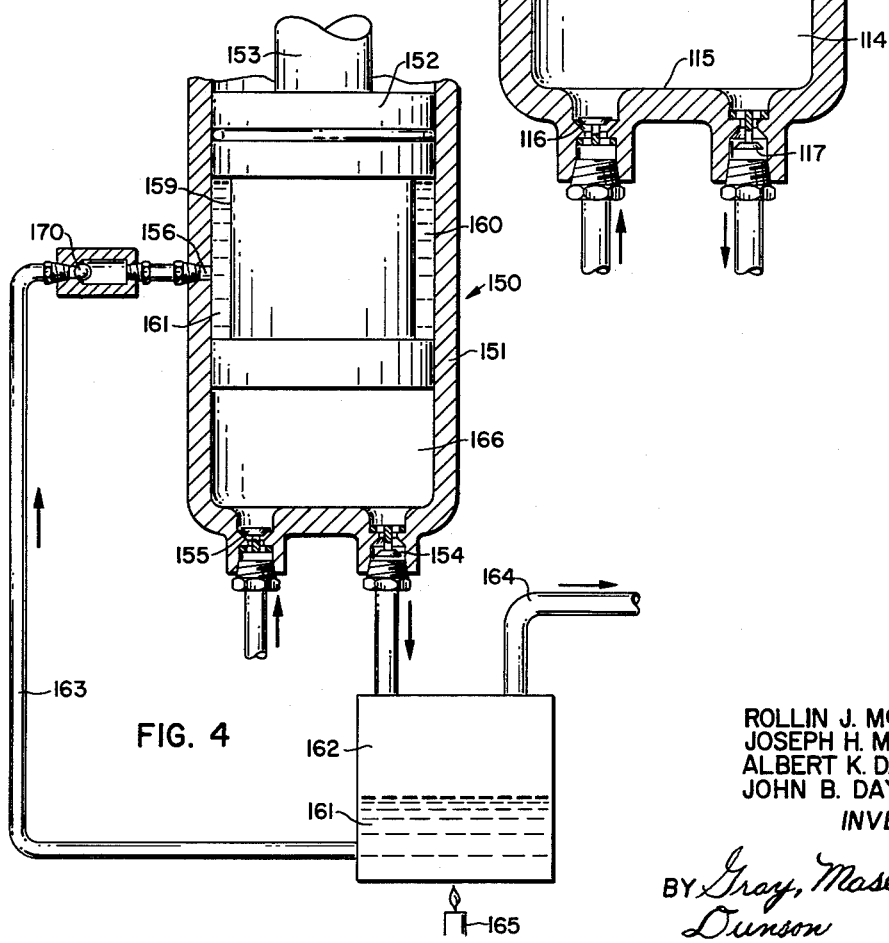
FIG. 4 is a schematic view of another form of the sealing apparatus of this invention, which employes the method of this invention.

FIG. 4, discloses a piston-cylinder apparatus which employs certain features of the method of this invention. In FIG. 4, a compressor designated generally as 150 comprises a cylinder 151 and a piston 152. Cylinder 151 may be connected to or formed as a part of the frame of a driving device such as a free-piston engine, not shown. Piston 152 is provided with a connecting rod portion 153 (partially shown) at one end. Connecting rod portion 153 is connected to an actuating mechanism of the driving device.

Cylinder 151 is provided with an outwardly opening discharge valve 154 and an inwardly opening suction valve 155 each of which may be connected in apparatus of the type shown in FIG. 1 or in apparatus of the type shown in FIG. 4. An inlet 156 for a sealant liquid 161 is provided in one side of cylinder 151.

Piston 152 is provided with annular extremity portions which reciprocate in piston 151 by sliding fit. A central recessed portion 159 provides, in conjunction with cylinder 151, an enclosure 160, which is filled with the sealant liquid 161.

In those installations where the loss of compressor gas by being dissolved in the liquid sealant, is not a critical factor, such as in an air compressor, the compressor discharge outlet 154 may be connected to a separator 162 which is in communication by means of a line 163 to the sealant liquid inlet 156. A check valve 170 is provided in the line 163 and is positioned to open toward inlet 156. Separator 162 is also provided with a compressor gas discharge line 164. Flow is in the direction indicated by the arrows in FIG. 4. Heat from a source 165 may be applied beneath separator 162 to facilitate the separation of compressor gas and liquid sealant.

The apparatus shown in FIG. 4 applies the sealing method of this invention in the following manner. On the down stroke of the piston 152, gas is compressed in the chamber 166 and is forced into the separator 162. The pressure of the liquid sealant 161 which is present in the reservoir of the separator 162, in the line 163, and the enclosure 160 is therefore maintained at the compressor discharge pressure during operation. At the beginning of the down stroke piston 152, the pressure in chamber 166 is at the suction pressure of the gas which has been admitted through suction inlet valve 155 on the up stroke. As the piston 152 progresses downward the pressure increases to compressor discharge presure. During that period of the stroke when the pressure in compressor chamber 166 is equal to compressor discharge pressure and to the pressure of the liquid sealant 161, the liquid sealant is not forced to flow toward chamber 166. However, during the upward stroke of the piston the pressure of the sealant liquid 161 is higher than the pressure of the compressor gas and flow will positively be induced toward the chamber 166. Flow cannot take place in the opposite direction because of check valve 170 in line 163. Because of the width of the lower contact flange of piston 152, any gas which is wiped toward enclosure 160 during the period when the pressure in chamber 166 is equal to the pressure in enclosure 160, will be wiped back and forced toward chamber 166 during other periods in the stroke.

Factors which have a bearing on producing the proper proportion to provide the required sealant flow conditions are: the ratio of suction pressure to discharge pressure in the compressor, the character of the sliding fit between the piston and the cylinder, and the characteristics of the compressor gas and the sealant liquid.

Each of the apparatuses shown utilizes the basic method of this invention which comprises the following steps: confining a sealing liquid at the surface of contact between rapidly reciprocating parts, regulating the pressure of the sealing liquid to a value higher than the pressure of a fluid at one side of one of the parts for a sufficiently long period to provide greater sealing liquid flow towards said fluid than away from said fluid, collecting the sealing liquid in the fluid, separating the sealing liquid from the fluid, and returning the sealing liquid to the contact position.

In the forms of apparatus shown in FIGS. 1, 2 and 3, the sealing liquid pressure is maintained higher than the fluid pressure at all times. Thus, the pressure of the sealing liquid is maintained at a value higher than the pressure of the fluid for a time sufficiently long to provide flow toward the fluid. In the form of apparatus shown in FIG. 4 the pressure of the sealing liquid is not maintained higher than the fluid pressure at all time, but is maintained at a higher pressure sufficiently long to provide sealing liquid flow towards said fluid during a portion of the stroke.

It will be understood, of course, that, while the forms of the invention herein shown and described constitute the preferred embodiments of the invention, it is not intended herein to illustrate all the possible equivalent forms or ramifications of the invention. It will also be understood that the words used are words of description, rather than of limitation, and various changes, such as changes in shape, relative size, and arrangement of parts may be substituted without departing from the spirit and scope of the invention herein disclosed.

What is claimed is:

1. A seal construction for rapidly reciprocating positive displacement gas compressors having a cylinder and a piston unitary reciprocable therein, and having closure means for one end of said cylinder forming a compressor chamber in conjunction with said cylinder and the contiguous end of said piston; comprising: an annular peripheral recess in said piston forming an enclosure in conjunction with said cylinder; said enclosure adapted to contain a sealing liquid; an inlet in the wall of said cylinder in communication with said enclosure at all positions during said piston reciprocation; separator means in communication with the discharge of said compressor chamber; stripper means in communication with said separator means through a valve operated responsively to the liquid level in said stripper means; pressure-responsive discharge means in communication between said stripper and said compressor chamber; and communication means between said stripper and said inlet in said cylinder wall.

2. A sealing construction for cylinder and piston units for the prevention of fluid flow around said piston at the surface of contact between the piston and the cylinder wall, comprising: a cylinder having an inlet through the wall thereof; a piston unit constructed to reciprocate in said cylinder by a sliding fit, having an annular contractible recess at the outer peripheral edge thereof and comprising contractible connected elements; said recess in communication with said inlet within the length of the stroke of said piston unit, and said recess forming an enclosure in conjunction with said cylinder wall; a sealing liquid in said enclosure, check valve means in communication with said inlet operative to close when the axial forces at the ends of said unit contract said enclosure, to raising the pressure of said sealing liquid to a value greater than the fluid pressure at the surface of contact between the piston unit and the cylinder wall upon the reciprocation of said piston unit in one direction in said cylinder.

3. A seal construction for rapidly reciprocating positive displacement gas compressors having a cylinder and a piston unit reciprocal therein, and closure means for one end of said cylinder forming a compressor chamber in conjunction with said cylinder and the contiguous end of said piston unit, wherein: said piston unit comprises first and second pistons; said second piston is reciprocable in said cylinder and formed with a recessed portion of smaller diameter than said sliding reciprocable portion; said second piston is contractibly connected to said first piston; said recessed portion forms an enclosure in conjunction with said piston connection and said cylinder wall, and the effective area of contact of said second piston with said enclosure is less than the effective area of said contiguous end of said piston unit; and wherein there is included; an inlet in the wall of said cylinder in communication with said enclosure at all positions during said piston reciprocation; separator means in communication with the discharge of said compressor chamber; a check valve in said inlet operable to close when the pressure in said enclosure exceeds the pressure in said separator chamber; stripper means in communication with said separator means through a valve operated responsively to the liquid level in said stripper means; pressure-responsive gas discharge means in communication with said stripper; and communication means between stripper and said inlet to said cylinder wall.

4. A seal for the prevention of fluid passage past reciprocating parts which operate between opposite chambers containing fluids, comprising: a cylinder having an inlet in the side thereof and having a closure at one end to form a chamber and having oppositely actuated check valve means therein to provide fluid pumping action on reciprocation of said piston; a first piston reciprocable in said cylinder by sliding fit, and having guide means therein; a stepped second piston axially spaced and reciprocable in said cylinder in sliding fit, having a first portion of reduced diameter and an attachment means loosely connecting said first piston and said second piston through said guide means; said first portion of reduced diameter forming an enclosure in conjunction with said first piston; a sealing liquid in said enclosure; and means for supplying a liquid sealant to said enclosure at a pressure greater than the pressure in said chambers during reciprocation of said piston in one direction.

5. A seal according to claim 4 wherein said guide means and loosely connecting means comprises a third piston reciprocable in a cylinder in one of said other pistons, and a slot and pin toggle.

6. A seal for the prevention of fluid passage around reciprocating parts which operate between opposite chambers containing fluids, for the prevention of fluid flow from one chamber to the other, comprising: a frame member, having a larger portion and a smaller portion; a partition member, having a larger portion constructed to reciprocate in the larger portion of said frame member by a sliding fit, and having a smaller portion constructed to reciprocate in said smaller portion of said frame member by a sliding fit, said partition member having a recess portion communicating with both the larger and the smaller portions of said frame member, forming an enclosure in conjunction with said frame member, an inlet in the wall of said frame member in communication with said enclosure at all positions in the stroke of reciprocation of said partition member; a pressure accumulative reservoir in communication with said inlet; and a liquid in said reservoir and said enclosure at a pressure greater than the pressure in at least one of said chambers during the stroke of reciprocation of said partition member.

7. A seal for the prevention of fluid passage around telescoping reciprocating parts which operate between opposite chambers containing fluids for the prevention of fluid flow from one chamber to the other, comprising: a frame member having a larger portion and a smaller portion; a partition member, having a larger portion constructed to reciprocate in the larger portion of said one frame member by a sliding fit, and having a smaller portion constructed to reciprocate in the smaller portion of said frame by a sliding fit, said partition member having a recessed portion communicating with both the larger and smaller portions of said frame member, forming an enclosure in conjunction with said frame member; an inlet in the wall of said frame member in communication with said enclosure at all positions in the stroke of reciprocation of said partition member; a pressure accumulative reservoir in communication with said inlet; a liquid in said reservoir and said enclosure at a pressure greater than the pressure in at least one of said chambers during the reciprocation of said partition member; separator means in communicaton with the discharge of said one of said chambers; stripper means in communication with said separator means through a valve operated responsively to the liquid level in said stripper means; pressure responsive fluid discharge means in communication with said stripper; and communication means between said stripper and said inlet.

8. A seal construction for rapidly reciprocating positive displacement gas compressors having a cylinder and a piston reciprocable therein, and closure means for one end of said cylinder forming a compressor chamber in conjunction with said cylinder and the contiguous end of said piston, comprising: a cylinder having a larger diameter portion and a smaller diameter portion in longitudinally spaced relation; said piston having a larger diameter portion constructed to reciprocate in the larger diameter portion of said cylinder by a sliding fit, and having a smaller diameter portion constructed to reciprocate in the smaller diameter portion of said cylinder by a sliding fit, said piston having a recessed portion communicating with both the larger and the smaller portions of the cylinder, forming an enclosure in conjunction with the cylinder; an inlet in the wall of the cylinder in communication with said enclosure at all positions in the stroke of recirpocating of said piston; a check valve in lative reservoir in communication with said inlet; a liquid in said reservoir and said enclosure at a pressure greater than the pressure in said compressor chamber during the stroke of reciprocation of said piston; a check valve in said inlet operable to close when the pressure in said enclosure exceeds the pressure in said compressor chamber; separator means in communication with the discharge of said compressor chamber; stripper means in communication with said separator means through a valve operated responsively to the liquid level in said stripper means; pressure responsive gas discharge means in communication with said stripper; and communication means between said stripper and said inlet to said cylinder.

References Cited by the Examiner
UNITED STATES PATENTS

| | | | |
|---|---|---|---|
| 1,260,100 | 3/1918 | Udell | 230—203 |
| 2,330,781 | 9/1943 | Langmyhr et al. | 103—204 |

FOREIGN PATENTS 73,718   11/1916   Switzerland.

DONLEY J. STOCKING, *Primary Examiner.*

ROBERT M. WALKER, LAURENCE V. EFNER,
*Examiners.*